(12) United States Patent
Sugaya

(10) Patent No.: US 9,923,939 B2
(45) Date of Patent: *Mar. 20, 2018

(54) ELECTRONIC SHARE SERVER, SCREEN SHARING METHOD, AND PROGRAM FOR ELECTRONIC SHARE SERVER

(71) Applicant: OPTiM Corporation, Saga (JP)

(72) Inventor: Shunji Sugaya, Tokyo (JP)

(73) Assignee: OPTIM CORPORATION, Saga-Shi (JP)

( * ) Notice: Subject to any disclaimer, the term of this patent is extended or adjusted under 35 U.S.C. 154(b) by 118 days.

This patent is subject to a terminal disclaimer.

(21) Appl. No.: 14/982,105

(22) Filed: Dec. 29, 2015

(65) Prior Publication Data

US 2016/0323331 A1 Nov. 3, 2016

(30) Foreign Application Priority Data

Apr. 29, 2015 (JP) .................. 2015-092477
May 12, 2015 (JP) .................. 2015-097647

(51) Int. Cl.
  *H04L 29/06* (2006.01)
  *H04W 12/06* (2009.01)
  *G06F 3/14* (2006.01)

(52) U.S. Cl.
  CPC .......... *H04L 65/403* (2013.01); *G06F 3/1454* (2013.01); *H04L 67/38* (2013.01); *H04W 12/06* (2013.01); *G09G 2370/022* (2013.01); *G09G 2370/042* (2013.01); *G09G 2370/16* (2013.01)

(58) Field of Classification Search
  CPC ...... H04W 12/06; G06F 3/1454; H04L 63/04; H04L 63/08; H04L 63/126; H04L 65/403; H04L 67/104; H04L 67/38
  See application file for complete search history.

(56) References Cited

U.S. PATENT DOCUMENTS

| | | | |
|---|---|---|---|
| 2012/0297305 A1* | 11/2012 | Hehmeyer | H04L 51/043 715/733 |
| 2014/0086105 A1* | 3/2014 | Kang | H04L 67/26 370/259 |
| 2014/0368410 A1* | 12/2014 | Imai | G06F 3/1415 345/2.2 |

(Continued)

FOREIGN PATENT DOCUMENTS

JP 2001-256137 9/2001

*Primary Examiner* — Khaled Kassim
(74) *Attorney, Agent, or Firm* — Lex IP Meister, PLLC

(57) ABSTRACT

The electronic share server allowing user terminals to share a screen receives a connection request each from a sender's user terminal 100a and a receiver's user terminal 100b, 100c, issues an authentication number to specify the sender's user terminal 100a with which a screen is to be shared, in response to the connection request, allows the receiver's user terminal 100b, 100c to display a prompt to ask for an input of the authentication number, and receives screen sharing data from the sender's user terminal 100a and sequentially transfers the screen sharing data to the receiver's user terminal 100b, 100c, if the authentication number is correct; and counts the receiver's user terminal 100b, 100c to which the screen sharing data is transmitted and do not transmit the screen sharing data if the counted number of the receiver's user terminal is a predetermined number or more.

9 Claims, 11 Drawing Sheets

(56) References Cited

U.S. PATENT DOCUMENTS

| | | | | |
|---|---|---|---|---|
| 2015/0019694 A1* | 1/2015 | Feng | .................... | H04L 65/601 |
| | | | | 709/219 |
| 2015/0084894 A1* | 3/2015 | Yang | .................... | G06F 3/1438 |
| | | | | 345/173 |
| 2015/0160913 A1* | 6/2015 | Lee | ...................... | G06F 3/1454 |
| | | | | 345/2.2 |
| 2015/0317123 A1* | 11/2015 | Wu | .................... | H04L 65/1089 |
| | | | | 715/727 |
| 2016/0337291 A1* | 11/2016 | Park | ....................... | H04L 51/14 |
| 2017/0109117 A1* | 4/2017 | Sugaya | ................. | G06F 3/1454 |
| 2017/0109519 A1* | 4/2017 | Sugaya | ................... | G06F 21/44 |

\* cited by examiner

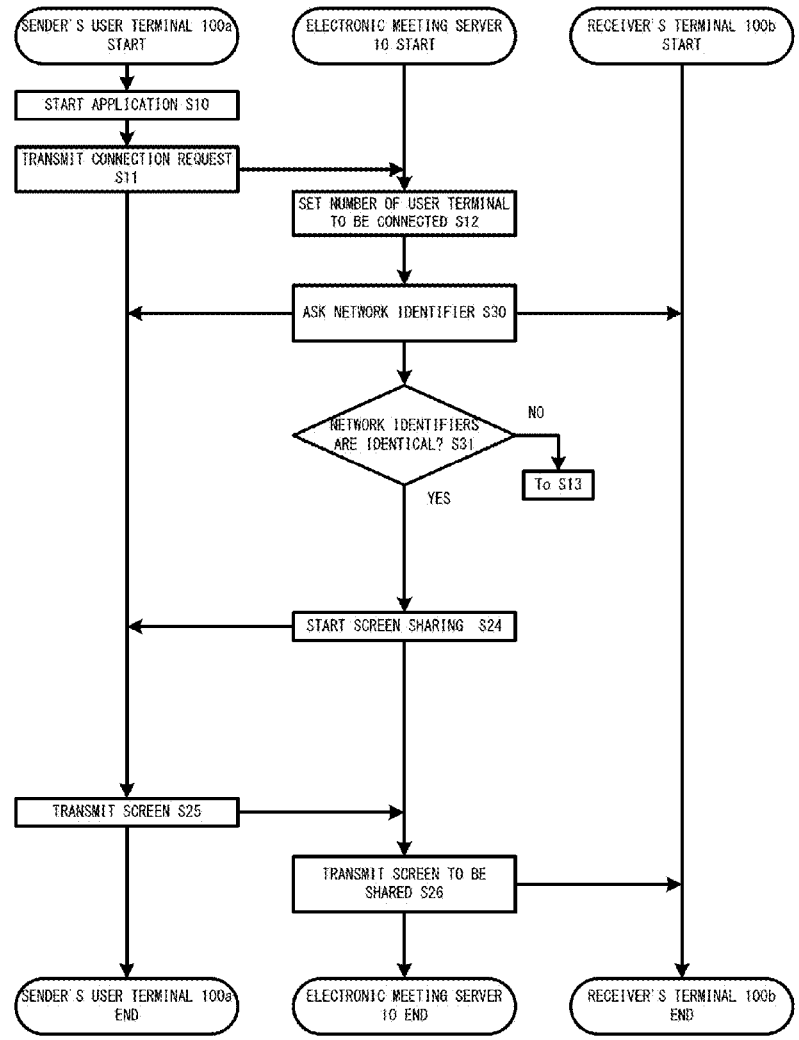

ELECTRONIC SHARE SERVER, SCREEN SHARING METHOD, AND PROGRAM FOR ELECTRONIC SHARE SERVER

CROSS REFERENCE TO RELATED APPLICATIONS

This application claims priority to Japanese Patent Application Nos. 2015-092477 and 2015-097647 filed on Apr. 29, 2015 and May 12, 2015, respectively, the entire contents of which are incorporated by reference herein.

TECHNICAL FIELD

The present invention relates to an electronic share server that allows a plurality of terminals to share a screen, a screen sharing method, and a program for the electronic share server.

BACKGROUND ART

Recently, a public line network such as the Internet has allowed terminals to remotely share a screen to hold a meeting online. In such an online conference, a user's terminal is connected with the remotely-located other party's terminal, through a server, to display the screen of the user's terminal on that of the other party's terminal, and vice versa.

As disclosed in Patent Document 1, only specific IP addresses are permitted to access the server, and then the users are authenticated, so as to allow only specific users to participate in such an online conference.

CITATION LIST

Patent Literature

Patent Document 1: JP 2001-256137 A

SUMMARY OF INVENTION

However, in such an online conference, security risks may occur because a screen may be shared with the terminal of an unintended user.

Moreover, the system of Patent Document 1 is less convenient because requiring to previously register IP addresses for which execute online conference is held.

An objective of the present invention is to an electronic share server, a screen sharing method, and a program for the electronic share server, which attempt security improvement, enable an easy network configuration, and enhance the user-friendliness when allowing a plurality of terminals to share a screen.

SUMMARY OF INVENTION

According to the first aspect of the present invention, an electronic share server allowing user terminals to share a screen includes:

a connection request receiving unit that receives a connection request each from a sender's user terminal and a receiver's user terminal;

an authentication number issuing unit that issues an authentication number to specify the sender's user terminal with which a screen is to be shared, in response to the connection request;

an input receiving unit that allows the receiver's user terminal to display a prompt to ask for an input of the authentication number;

a screen data transmitting unit that receives screen sharing data from the sender's user terminal and sequentially transmits the screen sharing data to the receiver's user terminal, if the authentication number is correct.

According to the first aspect of the present invention, an electronic share server allowing user terminals to share a screen receives a connection request each from a sender's user terminal and a receiver's user terminal, issues an authentication number to specify the sender's user terminal with which a screen is to be shared, in response to the connection request, allows the receiver's user terminal to display a prompt to ask for an input of the authentication number, and receives screen sharing data from the sender's user terminal and sequentially transmits the screen sharing data to the receiver's user terminal, if the authentication number is correct.

The first aspect of the present invention is the category of an electronic share server, but the categories of a screen sharing method and a program for the electronic share server have the same functions and effects.

According to the second aspect of the present invention, the electronic share server according to the first aspect of the present invention further includes a transmitting control unit that counts the receiver's user terminal to which the screen sharing data is transmitted and do not transmit the screen sharing data if the counted number of the receiver's user terminal is a predetermined number or more.

According to the second aspect of the present invention, the electronic share server according to the first aspect of the present invention counts the receiver's user terminal to which the screen sharing data is transmitted and do not transmit the screen sharing data if the counted number of the receiver's user terminal is a predetermined number or more.

According to the third aspect of the present invention, the electronic share server according to the first or the second aspect of the present invention further includes a number-of-screen sharing terminal notification unit that displays the counted number of the receiver's user terminal on the sender's user terminal and the receiver's user terminal.

According to the third aspect of the present invention, the electronic share server according to the first or the second aspect of the present invention displays the counted number of the receiver's user terminal on the sender's user terminal and the receiver's user terminal.

According to the fourth aspect of the present invention, the electronic share server according to any one of the first to the third aspects of the present invention further includes:

an elapsed-time judging unit that judges whether or not a predetermined time has passed since the authentication number was issued, in which the input receiving unit does not ask for an input of the authentication number if the elapsed-time judging unit judges that a predetermined time has passed.

According to the fourth aspect of the present invention, the electronic share server according to any one of the first to the third aspects of the present invention judges whether or not a predetermined time has passed since the authentication number was issued, and does not ask for an input of the authentication number if judging that a predetermined time has passed.

According to the fifth aspect of the present invention, in the electronic share server according to any one of the first to the fourth aspects of the present invention, the screen data transmitting unit sequentially transmits screen sharing data if the sender's user terminal and the receiver's user terminal are connected with a local network with which the electronic share server is connected.

According to the fifth aspect of the present invention, the electronic share server according to any one of the first to the fourth aspects of the present invention sequentially transmits screen sharing data if the sender's user terminal and the receiver's user terminal are connected with a local network with which the electronic share server is connected.

According to the sixth aspect of the present invention, the electronic share server according to any one of the first to the fifth aspects of the present invention further includes a network identifier judging unit that judges the identifier of a network with which the sender's user terminal and the receiver's user terminal are each connected, in which the authentication number issuing unit does not issue an authentication number, and the screen data transmitting unit receives screen sharing data from the sender's user terminal and sequentially transfers the screen sharing data to the receiver's user terminal, if the identifier is identical to each other.

According to the sixth aspect of the present invention, the electronic share server according to any one of the first to the fifth aspects of the present invention judges the identifier of a network with which the sender's user terminal and the receiver's user terminal are each connected, in which the authentication number issuing unit does not issue an authentication number, and the screen data transmitting unit receives screen sharing data from the sender's user terminal and sequentially transfers the screen sharing data to the receiver's user terminal, if the identifier is identical to each other.

According to the seventh aspect of the present invention, a method of screen sharing performed by an electronic share server allowing user terminals to share a screen includes the steps of:

receiving a connection request each from a sender's user terminal and a receiver's user terminal;

issuing an authentication number to specify the sender's user terminal with which a screen is to be shared, in response to the connection request;

allowing the receiver's user terminal to display a prompt to ask for an input of the authentication number; and receiving screen sharing data from the sender's user terminal and sequentially transmitting the screen sharing data to the receiver's user terminal, if the authentication number is correct.

According to the eighth aspect of the present invention, a computer program product for use in an electronic share server allowing user terminals to share a screen, including a non-transitory computer usable medium having a set of instructions physically embodied therein, the set of instructions including computer readable program code, which when executed by the electronic share server causes the information processing unit to:

receive a connection request each from a sender's user terminal and a receiver's user terminal;

issue an authentication number to specify the sender's user terminal with which a screen is to be shared, in response to the connection request;

allow the receiver's user terminal to display a prompt to ask for an input of the authentication number; and receive screen sharing data from the sender's user terminal and sequentially transmit the screen sharing data to the receiver's user terminal, if the authentication number is correct.

The present invention can provide an electronic share server, a screen sharing method, and a program for the electronic share server, which attempt security improvement, enable an easy network configuration, and enhance the user-friendliness when allowing a plurality of terminals to share a screen.

BRIEF DESCRIPTION OF DRAWINGS

FIG. 11 is a flow chart showing another embodiment of the screen sharing process.

DESCRIPTION OF EMBODIMENTS

Embodiments of the present invention will be described with reference to the attached drawings. However, this is illustrative only, and the technological scope of the present invention is not limited thereto.

Configuration of Electronic Meeting System 1

Figure 1:
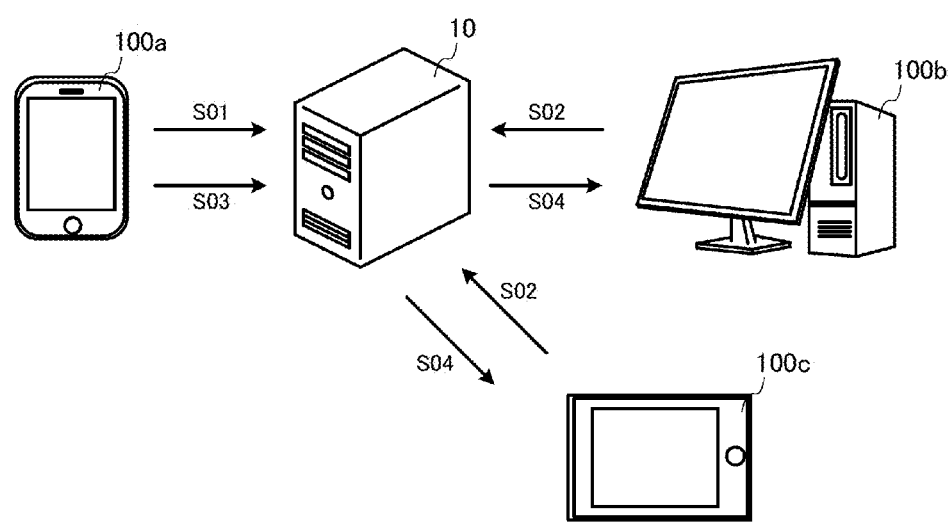
FIG. 1 conceptually shows the electronic meeting system 1.

The outline of the present invention will be described with reference to FIG. 1. The sender's user terminal 100a performs screen sharing. The sender's user terminal 100a transmits its own screen. The sender's user terminal 100a transmits a connection request to the electronic share server 10 before performing screen sharing (step S01).

The electronic share server 10 issues an authentication number in response to the connection request received from the sender's user terminal 100a. The electronic share server 10 also receives a connection request from the receiver's user terminal 100b, 100c. The receiver's user terminal 100b, 100c receives the screen transmitted from the sender's user terminal 100a. The electronic share server 10 allows the receiver's user terminal 100b, 100c to display a prompt to ask for the issued authentication number. The receiver's user terminal 100b, 100c displays a prompt to ask for an input of the authentication number and receives an authentication number input from the user. The receiver's user terminal 100b, 100c transmits the received authentication number to the electronic share server 10 (step S02).

The electronic share server 10 judges whether or not the authentication number received from the receiver's user terminal 100b, 100c is correct. If judging that the authentication number received from a receiver's user terminal 100b, 100c is incorrect, the electronic share server 10 does not allow the user terminal that transmitted an incorrect authentication number to share the screen. The electronic share server 10 performs the alert generation process on a user terminal that transmitted an incorrect authentication number.

If the authentication number received from the receiver's user terminal 10b, 100c is correct, the electronic share server 10 counts the number of the receiver's user terminal that is currently connecting to the electronic share server 10. If the counted number of the user terminal is less than a predetermined number, the electronic share server 10 allows the receiver's user terminal 100b, 100c to share the screen (step S03, S04). On the other hand, if the counted number of the user terminal is a predetermined number or more, the electronic share server 10 does not allow the receiver's user terminal 100b, 100c to share the screen. In this case, the electronic share server 10 performs the alert generation process on a user terminal that transmitted a connection request.

The electronic share server 10 judges whether or not the receiver's user terminal 100b, 100c is connected with the local area network with which the electronic share server 10 is connected. The electronic share server 10 acquires the IP address of the receiver's user terminal 100b, 100c and judges whether or not the receiver's user terminal 100b, 100c is connected with the local area network with which the electronic share server 10 is connected. If judging that the receiver's user terminal 100b, 100c is connected with the local area network with which the electronic share server 10 is connected, the electronic share server 10 allows the receiver's user terminal to share the screen (step S03, S04). On the other hand, if judging that the receiver's user terminal 100b, 100c is connected with a local area network with which the electronic share server 10 is not connected, the electronic share server 10 does not allow a user terminal to share the screen. In this case, the electronic share server 10 does not allow a user terminal connected with a different local area network to share the screen. Then, the electronic share server 10 performs the alert generation process on a user terminal connected with a different local area network.

The electronic share server 10 judges whether or not a predetermined time has passed since the authentication number received from the receiver's user terminal 100b, 100c was issued. If judging that a predetermined time has not passed since the authentication number received from the receiver's user terminal 100b, 100c was issued, the electronic share server 10 allows the receiver's user terminal to share the screen (step S03, S04). On the other hand, if judging that a predetermined time has passed since the authentication number received from a receiver's user terminal 100b, 100c was issued, the electronic share server 10 does not allow the receiver's user terminal to share the screen. In this case, the electronic share server 10 performs the alert generation process on user terminals that transmitted an authentication number that was issued before a predetermined time.

Configuration of Electronic Meeting System 1

Figure 2:
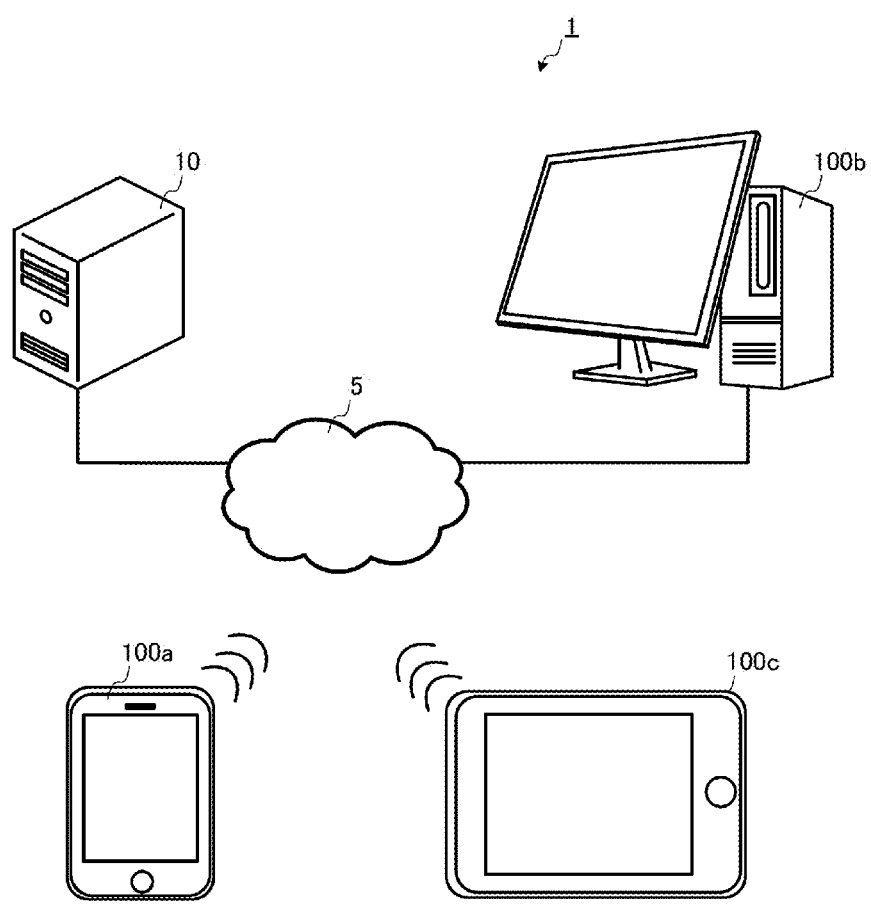
FIG. 2 shows an overall configuration of the electronic meeting system 1.

FIG. 2 is a block diagram illustrating an electronic meeting system 1 according to a preferable embodiment of the present invention. The electronic meeting system 1 includes an electronic share server 10, a sender's user terminal 100a, and a receiver's user terminal 100b, 100c, and a public line network 5 (e.g., the Internet network, third generation communication network, and fourth generation communication network).

The sender's user terminal 100a is communicatively connected with the electronic share server 10 through a public line network 5. Furthermore, the receiver's user terminal 100b, 100c is communicatively connected with the electronic share server 10 through a public line network 5. The sender's user terminal 100a and the receiver's user terminal 100b, 100c may be communicatively connected with each other through a public line network 5. The sender's user terminal 100a and the receiver's user terminal 100b, 100c may be communicatively connected with a public line network 5 through a network device such as a router. The sender's user terminal 100a and the receiver's user terminal 100b, 100c may be communicatively directly connected with each other through short-range wireless communication, etc.

The sender's user terminal 100a may be a general information terminal capable of allowing a user to browses web pages and executing various applications. The sender's user terminal 100a is an information device or an electrical appliance with the functions to be described later. For example, the user terminal 10 may be a mobile phone, a smart phone, a complex printer, a television, a network device such as a router or a gateway, and a computer. The user terminal 10 may also be a white good such as a refrigerator or a washing machine. The user terminal 10 may also be a general information appliance such as a telephone, a netbook terminal, a slate terminal, an electronic book terminal, an electronic dictionary terminal, a portable music player, and a portable content player and recorder.

In the same manner as the sender's user terminal 100a, the receiver's user terminal 100b, 100c may include not only a mobile phone, a smartphone, a multi-function printer, a television, and network devices such as a router and a gateway, a computer but also white goods such as a refrigerator, a washing machine and general home information appliances such as a telephone, a netbook computer, a slate device, an electronic book terminal, a portable music player, a portable content player and recorder.

The electronic share server 10 issues an authentication number to be described later, performs the alert generation process to be described later, and transmits the screen received from the sender's user terminal 100a to be described later to the receiver's user terminal 100b, 100c.

Functions

Figure 3:
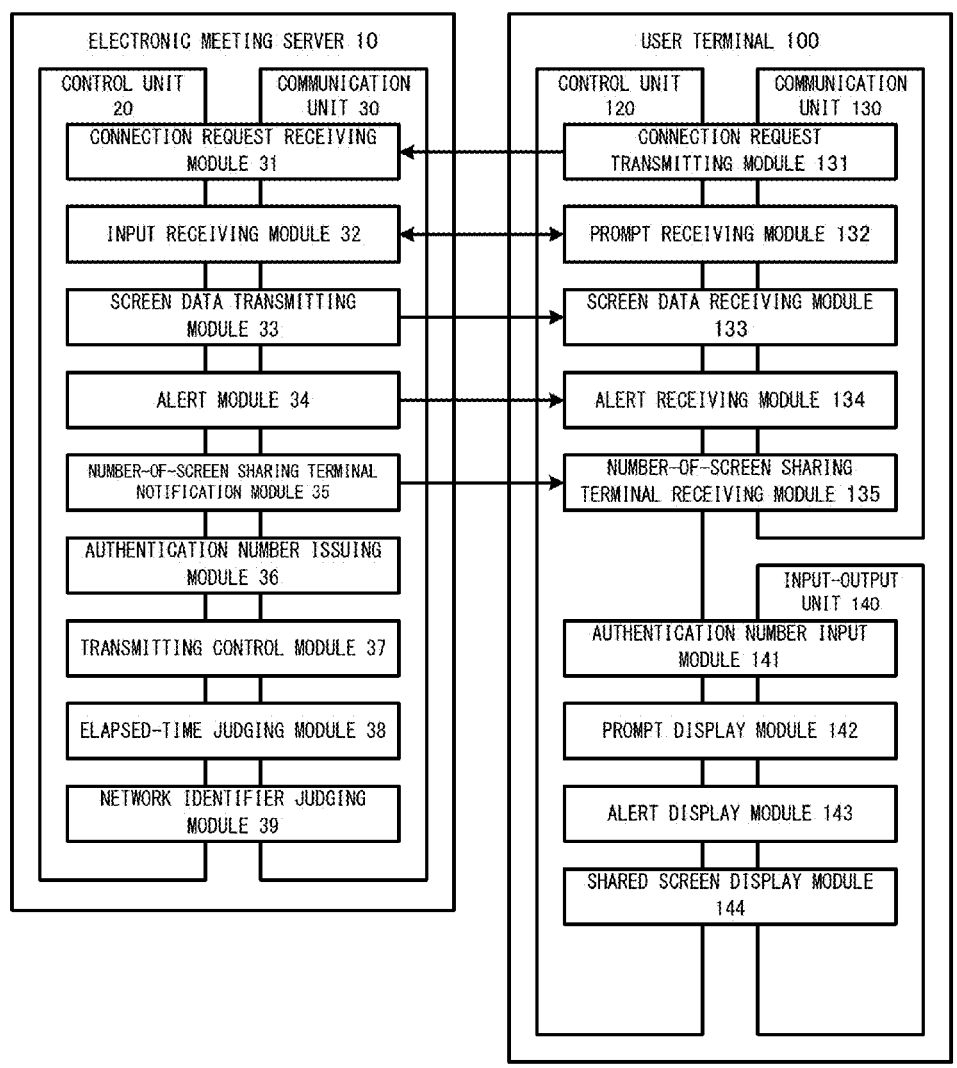
FIG. 3 is a functional block diagram of the electronic share server 10 and the user terminal 100.

FIG. 3 is a functional block diagram of the electronic share server 10 and the user terminal 100 (sender's user terminal 100a, receiver's user terminal 100b, 100c) to illustrate the relationship among the respective functions of the electronic share server 10 and the user terminal 100.

The electronic share server 10 is provided with a control unit 20 including a central processing unit (hereinafter referred to as "CPU"), a random access memory (hereinafter referred to as "RAM"), and a read only memory (hereinafter referred to as "ROM"); and a communication unit 30 including a Wireless Fidelity or Wi-Fi® enabled device complying with, for example, IEEE 802.11, or a wireless device complying with the IMT-2000 standard such as the third generation mobile communication system. The communication unit may include a wired device for LAN connection.

In the electronic share server 10, the control unit 20 reads a predetermined program and runs a connection request receiving module 31, an input receiving module 32, a screen data transmitting module 33, an alert module 34, a number-of-screen sharing terminal notification module 35, an authentication number issuing module 36, a transmitting control module 37, an elapsed-time judging module 38, and a network identifier judging module 39 in cooperation with the communication unit 30.

The user terminal 100 is provided with a control unit 120 including CPU, RAM, and ROM; and a communication unit 130 including a Wi-Fi® enabled device complying with, for example, IEEE 802.11, or a wireless device complying with the IMT-2000 standard such as the third generation mobile communication system. The communication unit may include a wired device for LAN connection.

The user terminal 100 is also provided with a storage unit as a memory unit such as a hard disk or a semiconductor memory to store data. The user terminal 100 is also provided with an input-output unit 140 including a display unit outputting data and images that have been processed by the control unit 120; and also including a touch panel, a keyboard, and a mouse that receive an input from a user.

In the user terminal 100, the control unit 120 reads a predetermined program and runs a connection request transmitting module 131, a prompt receiving module 132, a screen data receiving module 133, an alert receiving module 134, and a number-of-screen sharing terminal receiving module 135 in cooperation with the communication unit 130. Furthermore, in the user terminal 100, the control unit 120 reads a predetermined program and runs an authentication number input module 141, a prompt display module 142, an alert display module 143, and a shared screen display module 144 in cooperation with the input-output unit 140.

Screen Sharing Process

Figure 4:
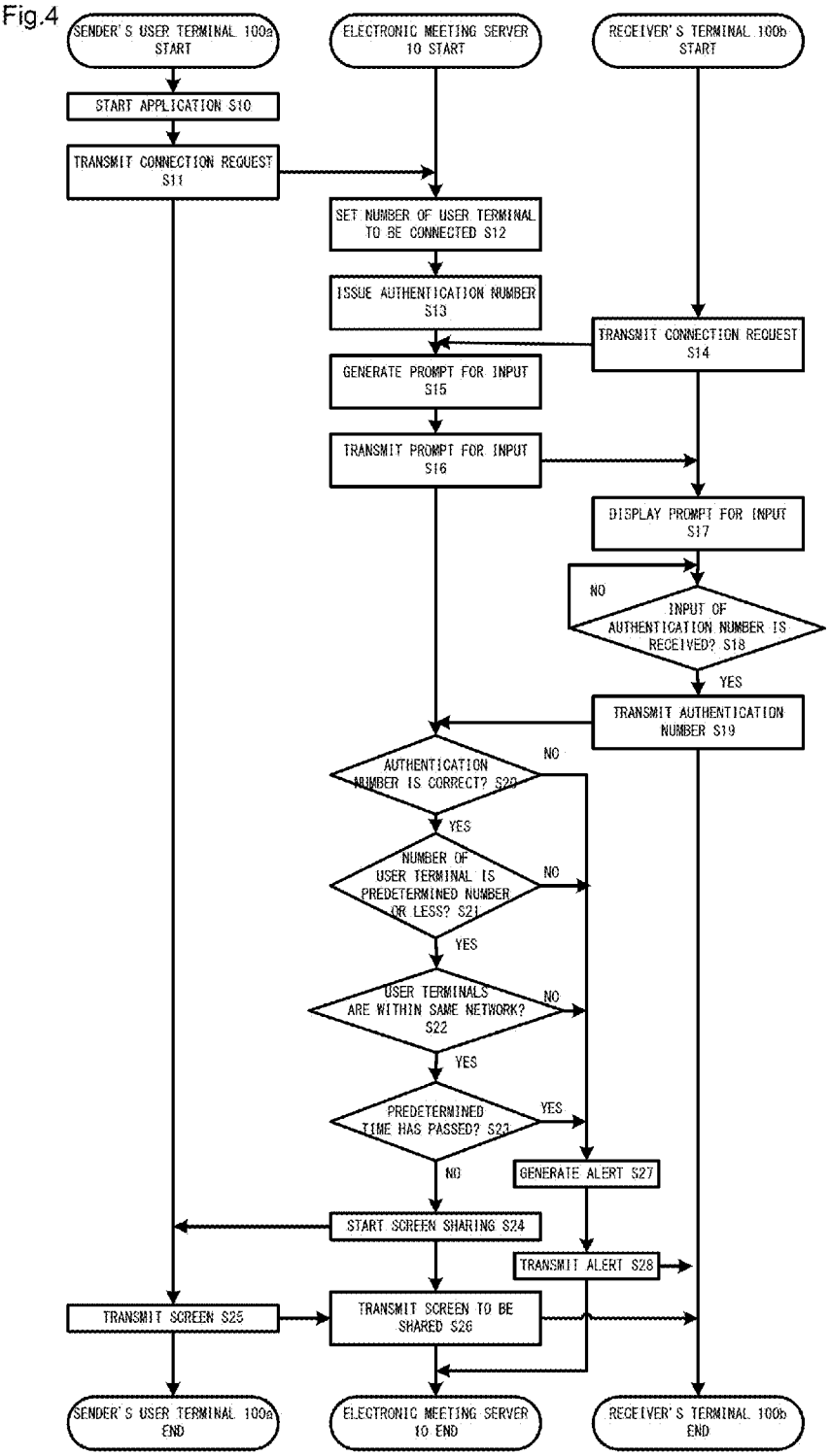
FIG. 4 is a flow chart of the screen sharing process executed by the electronic share server 10 and the user terminal 100.

FIG. 4 is a flow chart of the screen sharing process executed by the electronic share server 10, the sender's user terminal 100a, and the receiver's user terminal 100b. The process executed by the modules of the above-mentioned devices is explained together with this process. The receiver's user terminal 100b is an example. The process may be executed by the receiver's user terminal 100c or more than one additional receiver's user terminals. Moreover, any one of the user terminals may be a sender's user terminal, and the others may be receiver's user terminals.

First, the sender's user terminal 100a starts an application involved in screen sharing (step S10). The connection request transmitting module 131 of the sender's user terminal 100a transmits a connection request to the electronic share server 10 (step S11).

The connection request receiving module 31 of the electronic share server 10 receives a connection request transmitted from the sender's user terminal 100a. The input receiving module 32 of the electronic share server 10 sets the number of the receiver's user terminal to be allowed to share the screen (step S12). In the step S12, the input receiving module 32 may not set the number of the terminal. The number of the receiver's user terminal may be set based on the previously set number of the terminal. The sender's user terminal 100a may transmit a connection request containing the number of the terminal to be allowed to share the screen, and the electronic share server 10 may set the number of the terminal contained in this connection request as the number of the terminal to be allowed to share the screen.

The authentication number issuing module 37 of the electronic share server 10 issues an authentication number in response to the connection request received from the sender's user terminal 100a (step S13). In the step S13, the authentication number that was issued by the authentication number issuing module 37 is a combination of numbers, characters, signs, etc. This embodiment will be explained below assuming that this authentication number is "123456." Needless to say, the authentication number that was issued by the authentication number issuing module 37 may be other than this authentication number.

The receiver's user terminal 100b starts an application involved in screen sharing. The connection request transmitting module 131 of the receiver's user terminal 100b transmits a connection request to the electronic share server 10 (step S14).

The connection request receiving module 31 of the electronic share server 10 receives a connection request transmitted from the receiver's user terminal 100c. The input receiving module 32 of the electronic share server 10 generates a prompt to ask for an input of the authentication number (step S15). The input receiving module 32 transmits the generated prompt to the receiver's user terminal 100b (step S16).

The prompt receiving module 132 of the receiver's user terminal 100b receives the prompt transmitted from the input receiving module 32 of the electronic share server 10. The prompt display module 142 of the receiver's user terminal 100b displays the received prompt (step S17).

Figure 5:
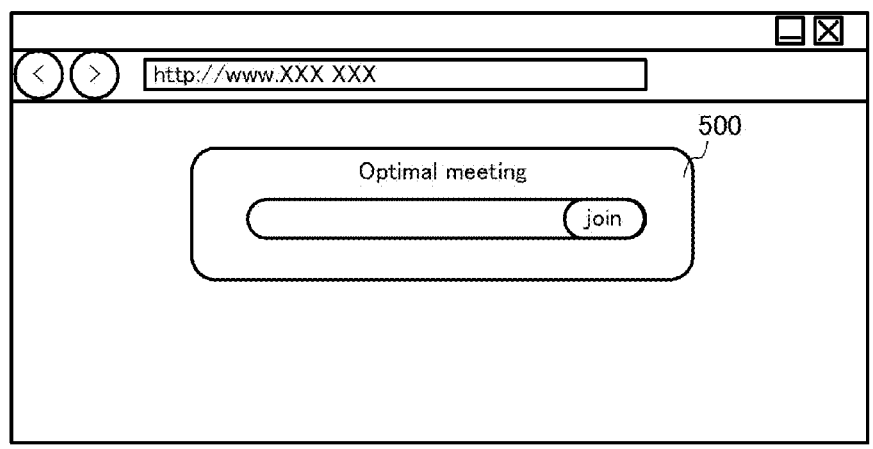
FIG. 5 shows a prompt asking for the authentication number, which is displayed on the user terminal 100.

FIG. 5 is displays the prompt 500 that the prompt display module 142 of the receiver's user terminal 100b displays in the step S16. The prompt display module 142 displays the prompt 500 in the window of a network browsing application. The authentication number input module 141 of the receiver's user terminal 100b judges whether or not to receive an input of the authentication number from the user (step S18).

In the step S18, if judging that the receiver's user terminal 100b has not received an input of the authentication number (NO), the authentication number input module 141 of the receiver's user terminal 100b repeats the step S18 until receiving an input of the authentication number.

In the step S18, if judging that the receiver's user terminal 100b has received an input of the authentication number (YES), the authentication number input module 141 of the receiver's user terminal 100b transmits the received authentication number to the electronic share server 10 (step S19).

The input receiving module 32 of the electronic share server 10 judges whether or not the received authentication number is correct (step S20). In the step S20, the input receiving module 32 judges whether or not the received authentication number is the same as the authentication number that was issued in the step S13. In the step S20, if the input receiving module 32 judges that the received authentication number is different from the authentication number that was issued in the step S13 (NO), the alert generation process to be described later is executed (step S27).

In the step S20, if the input receiving module 32 judges that the received authentication number is the same as the authentication number that was issued in the step S13 (YES), the number-of-screen sharing terminal notification module 35 of the electronic share server 10 judges whether or not the number of the receiver's user terminal currently being sharing the screen is less than a predetermined number (step S21). In the step S21, the number-of-screen sharing terminal notification module 35 counts the number of the receiver's user terminal currently being sharing.

In the step S21, if the number-of-screen sharing terminal notification module 35 judges that the counted number of the receiver's user terminal 100b by the number-of-screen sharing terminal notification module 35 itself is a predetermined number (NO) or more, the transmitting control module 37 of the electronic share server 10 does not transmit the screen data, and the alert generation process to be described later is executed (step S27). In the step S21, if the number-of-screen sharing terminal notification module 35 judges that the counted number of the receiver's user terminal 100b by the number-of-screen sharing terminal notification module 35 itself is less than a predetermined number (YES), the transmitting control module 37 of the electronic share server 10 judges whether or not the receiver's user terminal 100b is connected with the local area network with which the sender's user terminal 100a is connected (step S22).

In the step S22, the transmitting control module 37 of the electronic share server 10 acquires the IP address of the sender's user terminal 100a and then the IP address of the receiver's user terminal 100b. The transmitting control module 37 compares the network address of the IP address of the sender's user terminal 100a with that of the receiver's user terminal 100b. If the network address of the IP address of the sender's user terminal 100a is different from that of the receiver's user terminal 100b, the transmitting control module 37 judges that the sender's user terminal 100a is connected with a local area network with which the receiver's user terminal 100b is not connected (step S22: NO), and then the alert generation process to be described later is executed (step S27). In the step S22, if the network address of the IP address of the sender's user terminal 100a is the same as that of the receiver's user terminal 100b, the transmitting control module 37 judges that the sender's user terminal 100a is connected with the local area network with which the receiver's user terminal 100b is connected (step S22: YES) and then judges whether or not a predetermined time has passed since the authentication number sent from the receiver's user terminal in the step S19 was issued (step S23).

In the step S22, the transmitting control module 37 may judge whether or not to allow share the screen data only between the sender's user terminal and the receiver's user terminal each with a previously specified IP address. In this case, the transmitting control module 37 only has to acquire the IP address of the receiver's user terminal 100b and judge whether or not this IP address is the same as the previously specified IP address. If the IP address of the receiver's user terminal 100b is the same as the previously specified IP address, the transmitting control module 37 only has to execute the step S23. If the IP address of the receiver's user terminal 100b is different from the previously specified IP address, the transmitting control module 37 only has to execute the alert generation process to be described later. The number of the previously specified IP address is not limited to one and may be two or more. Moreover, the previously specified IP address may be only a network address.

In the step S23, the elapsed-time judging module 38 of the electronic share server 10 judges if a predetermined time has passed since the authentication number was issued in the step S13. In the step S23, if the elapsed-time judging module 38 judges that a predetermined time has passed (YES), the alert generation process to be described later is executed (step S27). In the step S23, if the elapsed-time judging module 38 judges that a predetermined time has not passed (NO), the screen data transmitting module 34 of the electronic share server 10 transmits a screen sharing start notification to the sender's user terminal 100a (step S24).

The sender's user terminal 100a receives the screen sharing start notification from the screen data transmitting module 33 of the electronic share server 10 and transmits its own screen data to the electronic share server 10 (step S25).

The screen data transmitting module 33 of the electronic share server 10 transmits the screen data received from the sender's user terminal 100a to the receiver's user terminal 100b (step S26).

The screen data receiving module 133 of the receiver's user terminal 100b receives the screen data transmitted from the electronic share server 10. The shared screen display module 144 of the receiver's user terminal 100b displays the received screen data as the shared screen shown in FIG. 6.

Figure 6:
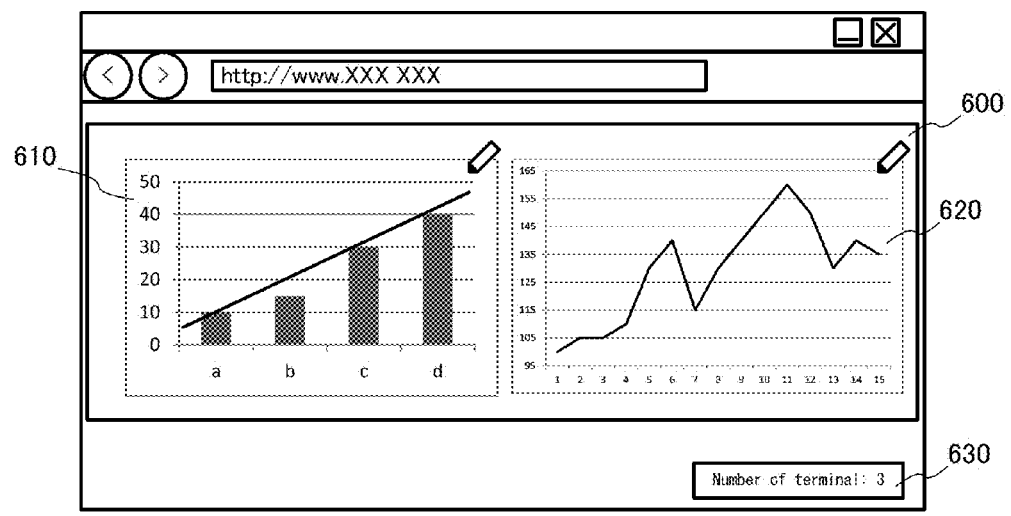
FIG. 6 shows a shared screen displayed on the user terminal 100.

FIG. 6 shows a shared screen displayed by the shared screen display module 144 of the receiver's user terminal 100b. The shared screen display module 144 displays a window frame 600 and a number-of-screen sharing terminal display frame 630. The shared screen display module 144 displays the shared screen 610, 620 in the window frame 600. The shared screen display module 144 displays the number of the terminal currently being sharing the screen as the number of the screen-sharing terminal in the number-of-screen sharing terminal display frame 630. The number of shared screen displayed in the window frame 600 is not limited to two and may be one or more than two unlike this embodiment. The position, the form, and the content of the number-of-screen sharing terminal display frame 630 may be changed when appropriate.

The order of the steps S20 to S23 may be changed when appropriate.

Alert Generation Process

The alert generation process of the step S27 will be explained below.

In the step S20, if the input receiving module 32 of the electronic share server 10 judges that the received authentication number is the same as the authentication number that was issued in the step S13 (NO), the alert module 34 of the electronic share server 10 generates an alert to warn of an incorrect authentication number (step S27). The alert module 34 transmits the generated alert to the receiver's user terminal 100b (step S28). The alert receiving module 134 of the receiver's user terminal 100b receives the alert. The alert display module 143 of the receiver's user terminal 100b displays the received alert as an alert notification screen as shown in FIG. 7.

Figure 7:
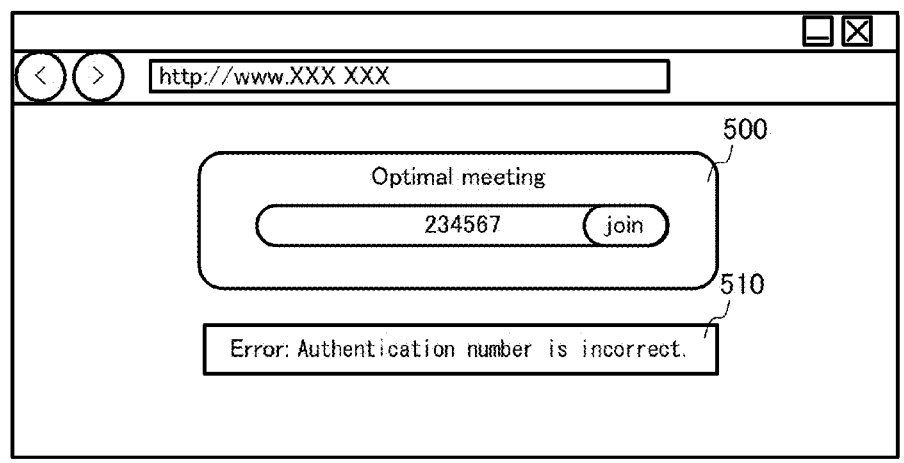
FIG. 7 shows an alert notification displayed on the user terminal 100.

FIG. 7 shows an alert notification screen displayed by the alert display module 143. In FIG. 7, the alert display module 143 displays the notification that the authentication number is incorrect in the alert frame 510.

Figure 8:
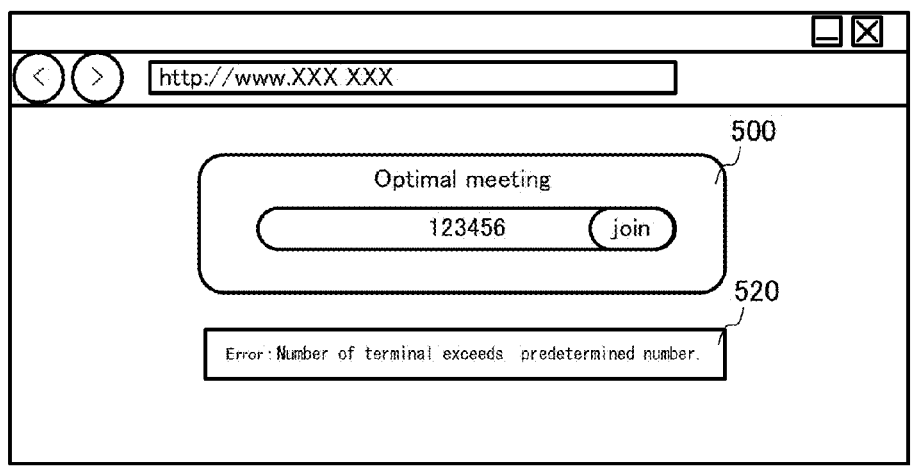
FIG. 8 shows an alert notification displayed on the user terminal 100.

In the step S21, if the transmitting control module 37 of the electronic share server 10 judges that the number of the receiver's user terminal 100b currently being sharing the screen that the number-of-screen sharing terminal notification module 35 counted is a predetermined number or more (NO), the alert module 34 of the electronic share server 10 generates an alert to warn of an excessive number of terminals being connected (step S27). The alert module 34 transmits the generated alert to the receiver's user terminal 100b (step S28). The alert receiving module 134 of the receiver's user terminal 100b receives the alert. The alert display module 143 of the receiver's user terminal 100b displays the received alert as an alert notification screen as shown in FIG. 8. In FIG. 8, the alert display module 143 displays the notification that the number of the terminal being sharing the screen exceeds a predetermined number in the alert frame 520.

Figure 9:
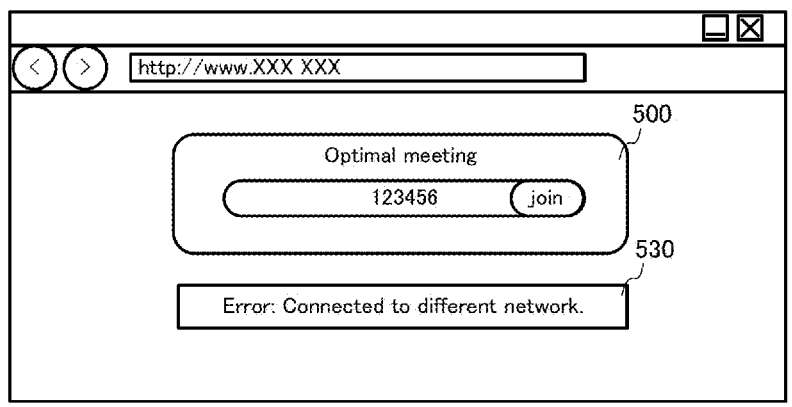
FIG. 9 shows an alert notification displayed on the user terminal 100.

In the step S22, if the transmitting control module 37 of the electronic share server 10 judges that the sender's user terminal 100a is connected with a local area network with which the receiver's user terminal 100b is not connected (NO), the alert module 34 of the electronic share server 10 generates an alert to warn that the receiver's user terminal is connected with a different local area network (step S27). The alert module 34 transmits the generated alert to the receiver's user terminal 100b (step S28). The alert receiving module 134 of the receiver's user terminal 100b receives the alert. The alert display module 143 of the receiver's user terminal 100b displays the received alert as an alert notification screen as shown in FIG. 9. In FIG. 9, the alert display module 143 displays the notification that the receiver's user terminal 100b is connected with a different local area network in the alert frame 530.

Figure 10:
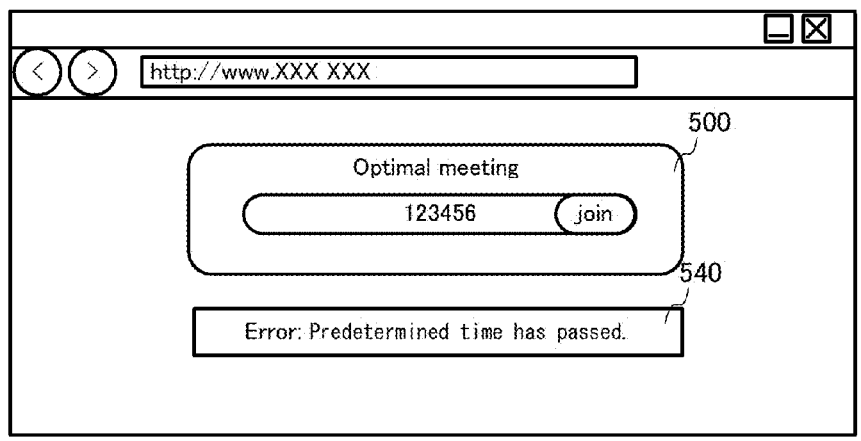
FIG. 10 shows an alert notification displayed on the user terminal 100.

In the step S23, if the elapsed-time judging module 38 of the electronic share server 10 judges that a predetermined time has passed (YES), the alert module 34 of the electronic share server 10 generates an alert to warn that a predetermined time has passed since the received authentication number was issued (step S27). The alert module 34 transmits the generated alert to the receiver's user terminal 100b (step S28). The alert receiving module 134 of the receiver's user terminal 100b receives the alert. The alert display module 143 of the receiver's user terminal 100b displays the received alert as an alert notification screen as shown in FIG. 10. In FIG. 10, the alert display module 143 displays the notification that a predetermined time has passed in the alert frame 540.

Second Embodiment of Screen Sharing Process

FIG. 11 is a flow chart of the second embodiment of the screen sharing process shown in FIG. 4 that is executed by the electronic share server 10, the sender's user terminal 100a, and the receiver's user terminal 100b. In the second embodiment, the process to judge the network identifier (step S31) is executed by the network identifier judging module 39 after the number of the receiver's user terminal to be allowed to share the screen is set by the electronic share server 10 (step S12).

After the step S12, the network identifier judging module 39 of the electronic share server 10 queries the sender's user terminal 100a and the receiver's user terminal 100b to obtain the network identifier (step S30). The network identifier may be a service set identifier (hereinafter referred to as "SSID") that is the wireless network identifier or may be a network address, or an address identifying a local area network.

The sender's user terminal 100a and the receiver's user terminal 100b each respond to the enquiry from the electronic share server 10 and each transmit their own network identifier to the electronic share server 10. The network identifier judging module 39 that has received these network identifiers judges whether or not the network identifiers of the sender's user terminal 100a and the receiver's user terminal 100b are identical to each other (step S31). If the network identifiers are identical to each other (step S31: YES), the process proceeds to the step S24 in which the electronic share server 10 allows the terminals to share the screen. On the other hand, if the network identifiers are different from each other (step S31: NO), the process proceeds to the step S13 in which the electronic share server 10 asks for an input the authentication number.

Therefore, according to the second embodiment, if the sender's user terminal 100a and the receiver's user terminal 100b are connected with the same local area network, the electronic share server 10 allows the terminals to share the screen without asking for an input of the authentication number, assuming that the security is guaranteed. As a result, the convenience of screen sharing can be improved.

Other Embodiments

In the embodiments described above, the transmitting control module 37 of the electronic share server 10 allows the terminals to share the screen data after receiving a correct authentication number. When the sender's user terminal 100a can be connected with the receiver's user terminal 100b through short-range wireless communication by beacons, IR communication, Bluetooth®, etc., the electronic share server 10 may allow the user terminals to share the screen data. In this case, the sender's user terminal 100a and the receiver's user terminal 100b acquires a permission to share the screen data through short-range wireless communication. The receiver's user terminal 100b transmits the acquired permission to the electronic share server 10. The electronic share server 10 transmits the screen data of the sender's user terminal 100a to the receiver's user terminal 100b from which the electronic share server 10 has received the permission. The receiver's user terminal 100b receives the screen data transmitted from the electronic share server 10. The electronic share server 10 displays the received screen data.

Moreover, information data on the SIM card mounted on each of the sender's user terminal and the receiver's user terminal may be previously stored in the electronic share server 10 to allow the sender's user terminal and the receiver's user terminal with the respective SIM cards, the information data of which are stored in the electronic share server 10 to share the screen data. In this case, the receiver's user terminal transmits a connection request together with the information data on the SIM card mounted on the receiver's user terminal itself to the electronic share server. The electronic share server compares the received information data with the information data stored in the electronic share server itself. If the information data are identical to each other, the electronic share server can allow the terminals to share the screen data. If the information data are different from each other, the electronic share server should not allow the terminals to share the screen data. The number of the SIM card stored in the electronic share server may be one or may be two or more.

Moreover, the respective MAC addresses of the sender's user terminal and the receiver's user terminal may be previously stored in the electronic share server 10 to allow the sender's user terminal and the receiver's user terminal with the respective stored MAC addresses to share the screen data. In this case, the receiver's user terminal transmits a connection request together with its own MAC address to the electronic share server. The electronic share server compares the received MAC address with the MAC address stored in the electronic share server itself. If the MAC addresses are identical to each other, the electronic share server can allow the terminals to share the screen data. If the MAC addresses are different from each other, the electronic share server should not allow the terminals to share the screen data. The number of the MAC address in the electronic share server may be one or may be two or more.

Moreover, the respective phone numbers of the sender's user terminal and the receiver's user terminal may be previously stored in the electronic share server 10 to allow the sender's user terminal and the receiver's user terminal with the respective stored phone numbers to share the screen data. In this case, the receiver's user terminal transmits a connection request together with its own phone number to the electronic share server. The electronic share server compares the received phone number with the phone number stored in the electronic share server itself. If the phone numbers are identical to each other, the electronic share server can allow the terminals to share the screen data. If the phone numbers are different from each other, the electronic share server should not allow the terminals to share the screen data. The number of the phone number stored in the electronic share server may be one or may be two or more. Moreover, the electronic share server may store a phone number by registering a phone number in an address book application. In this case, the electronic share server only has to compare a received phone number with a phone number registered in the application.

Moreover, the terminal may be identified with an international mobile equipment identity (hereinafter referred to as "IMEI") that is the unique identification number of a terminal, authenticated, and share the screen data. In addition, the screen data may be shared with only a terminal with a specified IP address.

Moreover, the phone number of the receiver's user terminal may be previously stored in the sender's user terminal to allow the receiver's user terminal with this phone number to share the screen data with the sender's user terminal. In this case, the receiver's user terminal transmits a connection request together with its own phone number to the electronic share server. Then, the electronic share server may acquire a phone number stored in the sender's user terminal and compare the phone number stored in the sender's user terminal with the phone number received from a receiver's user terminal. If the phone numbers are identical to each other, the electronic share server can allow the terminals to share the screen data. If the phone numbers are different from each other, the electronic share server should not allow the terminals to share the screen data. The number of the phone number stored in the sender's user terminal may be one or may be two or more. Moreover, the sender's user terminal may store a phone number by registering a phone number in an address book application. In this case, the electronic share server only has to acquire a phone number registered in the application.

To achieve the means and the functions that are described above, a computer (including CPU, an information processor, and various terminals) reads and executes a predetermined program. For example, the program is provided in the form recorded in a computer-readable medium such as a flexible disk, CD (e.g. CD-ROM), and DVD (e.g. DVD-ROM, DVD-RAM). In this case, a computer reads a program from the recording medium, forwards and stores the program to and in an internal or an external storage, and executes it. The program may be previously recorded in, for example, a storage (recording medium) such as a magnetic disk, an optical disk, and a magnetic optical disk and provided from the storage to a computer through a communication line.

The embodiments of the present invention are described above. However, the present invention is not limited to the above-mentioned embodiments. The effect described in the embodiments of the present invention is only the most preferable effect produced from the present invention. The effects of the present invention are not limited to that described in the embodiments of the present invention.

REFERENCE SIGNS LIST

1 Electronic meeting system, 5 Public network, 10 Electronic share server, 100 User terminal

What is claimed is:

1. An electronic share server allowing user terminals to share a screen, comprising:
  a communication device; and
  at least one processor that:
    receives, via the communication device a connection request each from a sender's user terminal and a receiver's user terminal; judges a first network identifier of a network with which the sender's user terminal is connected and a second network identifier of a network with which the receiver's user terminal is connected;
    issues an authentication number to specify the sender's user terminal with which a screen is to be shared, in response to the connection request when the first network identifier is different from the second network identifier;
    allows, via the communication device, the receiver's user terminal to display a prompt to ask for an input of the authentication number;
    receives, via the communication device, screen sharing data from the sender's user terminal and sequentially, via the communication device, transmits the screen sharing data to the receiver's user terminal, when the authentication number is correct;
    when the first network identifier is identical to the second network identifier receives, via the communication device, screen sharing data from the sender's user terminal and sequentially transmits, via the communication device, the screen sharing data to the receiver's user terminal, without issuing the authentication number;
  wherein the at least one processor counts the receiver's user terminal to which the screen sharing data is transmitted and does not transmit the screen sharing data when the counted number of the receiver's user terminal is a predetermined number or more; and
  wherein the at least one processor judges whether or not a predetermined time has passed since the authentication number was issued, and does not ask for an input of the authentication number when judging that a predetermined time has passed.

2. The electronic share server according to claim 1, further comprising a number-of-screen sharing terminal notification unit that wherein the at least one processor displays the counted number of the receiver's user terminal on the sender's user terminal and the receiver's user terminal.

3. The electronic share server according to claim 1, wherein in a case where transmitting the screen sharing data to the receiver's user terminal, the at least one processor sequentially transmits, via the communication device, screen sharing data when the sender's user terminal and the receiver's user terminal are connected with a local network with which the electronic share server is connected, and does not transmit the screen sharing data when the sender's user terminal and the receiver's user terminal are not connected with the local network.

4. A method of screen sharing performed by an electronic share server allowing user terminals to share a screen, comprising the steps of:
  receiving a connection request each from a sender's user terminal and a receiver's user terminal;
  judging a first network identifier of a network with which the sender's user terminal is connected and a second network identifier of a network with which the receiver's user terminal is connected;

issuing an authentication number to specify the sender's user terminal with which a screen is to be shared, in response to the connection request when the first network identifier is different from the second network identifier;

allowing the receiver's user terminal to display a prompt to ask for an input of the authentication number;

receiving screen sharing data from the sender's user terminal and sequentially transmitting the screen sharing data to the receiver's user terminal, when the authentication number is correct;

when the first network identifier is identical to the second network identifier receiving screen sharing data from the sender's user terminal and sequentially transmitting the screen sharing data to the receiver's user terminal, without issuing the authentication number;

counting the receiver's user terminal to which the screen sharing data is transmitted, and not transmitting the screen sharing data when the counted number of the receiver's user terminal is a predetermined number or more; and judging whether or not a predetermined time has passed since the authentication number was issued, and not asking for an input of the authentication number when judging that a predetermined time has passed.

5. The method according to claim 4, further comprising displaying the counted number of the receiver's user terminal on the sender's user terminal and the receiver's user terminal.

6. The method according to claim 4, wherein sequentially transmitting the screen sharing data includes sequentially transmitting the screen sharing data when the sender's user terminal and the receiver's user terminal are connected with a local network with which the electronic share server is connected, and not transmitting the screen sharing data when the sender's user terminal and the receiver's user terminal are not connected with the local network.

7. A computer program product for use in an electronic share server allowing user terminals to share a screen, comprising a non-transitory computer usable medium having a set of instructions physically embodied therein, the set of instructions including computer readable program code, which when executed by the electronic share server causes the information processing unit to:

receive a connection request each from a sender's user terminal and a receiver's user terminal;

judge a first network identifier of a network with which the sender's user terminal is connected and a second network identifier of a network with which the receiver's user terminal is connected;

issue an authentication number to specify the sender's user terminal with which a screen is to be shared, in response to the connection request when the first network identifier is different from the second network identifier;

allow the receiver's user terminal to display a prompt to ask for an input of the authentication number;

receive screen sharing data from the sender's user terminal and sequentially transmit the screen sharing data to the receiver's user terminal, when the authentication number is correct;

when the first network identifier is identical to the second network identifier, receive screen sharing data from the sender's user terminal and sequentially transmit the screen sharing data to the receiver's user terminal, without issuing the authentication number;

wherein the set of instructions including computer readable program code causes the information processing unit further to count the receiver's user terminal to which the screen sharing data is transmitted, and not transmit the screen sharing data when the counted number of the receiver's user terminal is a predetermined number or more; and wherein the set of instructions including computer readable program code causes the information processing unit further to judge whether or not a predetermined time has passed since the authentication number was issued, and not ask for an input of the authentication number when judging that a predetermined time has passed.

8. The computer program product according to claim 7, wherein the set of instructions including computer readable program code causes the information processing unit further to display the counted number of the receiver's user terminal on the sender's user terminal and the receiver's user terminal.

9. The computer program product according to claim 7, wherein the set of instructions including computer readable program code causes the information processing unit further to, in a case where transmitting the screen sharing data to the receiver's user terminal, sequentially transmit the screen sharing data includes sequentially transmitting the screen sharing data when the sender's user terminal and the receiver's user terminal are connected with a local network with which the electronic share server is connected, and not transmit the screen sharing data when the sender's user terminal and the receiver's user terminal are not connected with the local network.

* * * * *